Feb. 16, 1965  A. J. M. FREEMAN  3,169,413
ACTUATING MECHANISMS

Filed Oct. 29, 1962  2 Sheets-Sheet 1

INVENTOR
A. J. M. Freeman
BY
ATTORNEY

United States Patent Office 3,169,413
Patented Feb. 16, 1965

3,169,413
ACTUATING MECHANISMS
Alan John Morris Freeman, Hatfield, England, assignor to Drayton Controls Limited, West Drayton, England, a company of Great Britain
Filed Oct. 29, 1962, Ser. No. 233,833
Claims priority, application Great Britain, Nov. 6, 1961, 39,580/61
8 Claims. (Cl. 74—625)

The present invention relates to actuating mechanisms more particularly actuating mechanisms for imparting linear movement and has for an object to provide such a mechanism having two independently operable driving means which can be employed either individually or simultaneously.

According to the invention, an actuating mechanism for imparting linear movement comprises a helical worm supported for axial movement and adapted to be connected to an actuating member for effecting linear movement thereof and a conjugate toothed wheel engaging the said worm, the arrangement being such as to provide two relevant modes of combined working between the worm and the wheel.

Thus in the arrangement according to the invention if the worm wheel is restrained against rotation, and the worm is rotated, a "screw jack" action is produced by the rotating worm thread engaging in the stationary teeth of the worm wheel and the worm is moved axially to impart the desired linear movement to an actuating member connected therewith. Alternatively, by restraining the worm against rotation and the worm wheel is rotated, the worm is propelled in an axial direction by the rack and pinion action between the worm and the worm wheel. Simultaneous rotation of both the worm and the worm wheel can also be effected and is either contributary or compensatory with respect to the movement applied to the actuating member, depending on the relative directions of rotation of the worm and the worm wheel.

Conveniently either the worm or the worm wheel is driven by an electric motor and the worm wheel or the worm is arranged to be rotated by manual means and in this manner there is provided an arrangement in which the mechanism is normally driven by the electric motor but in the event of a power failure or a defect in the motor, the mechanism is immediately operable by manual control.

Figure 1:
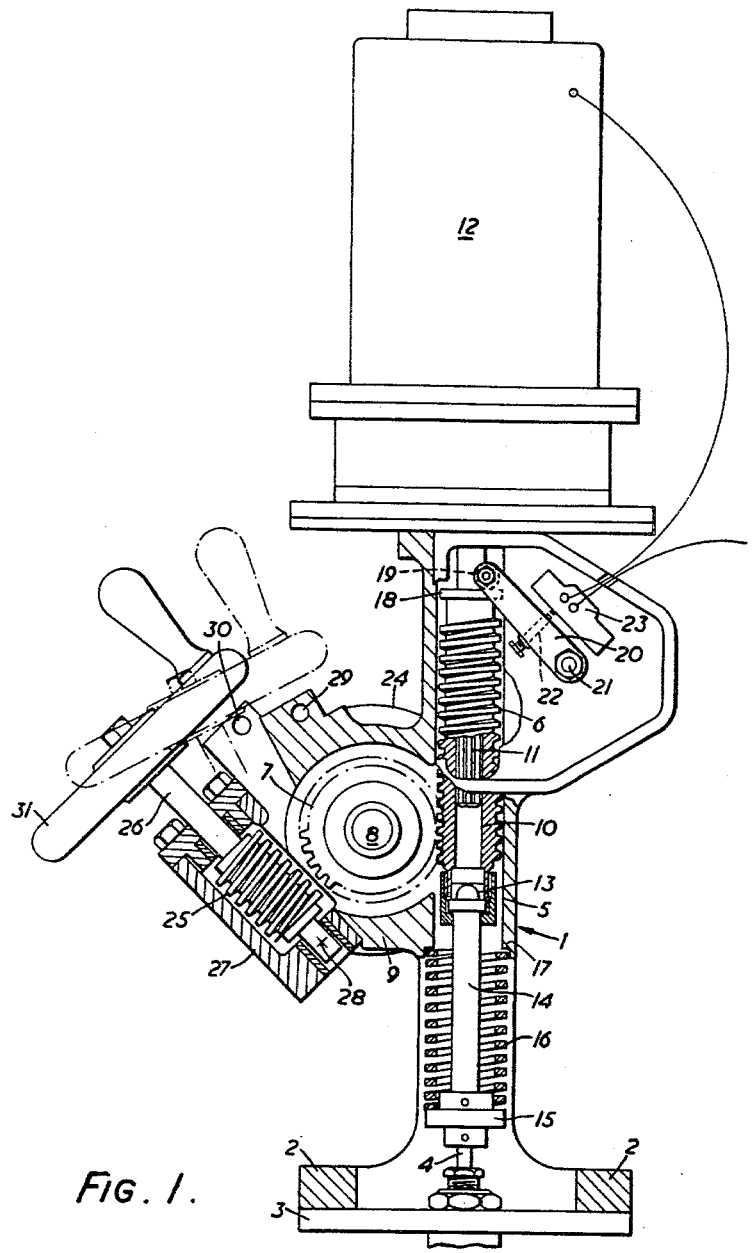
Figure 2:
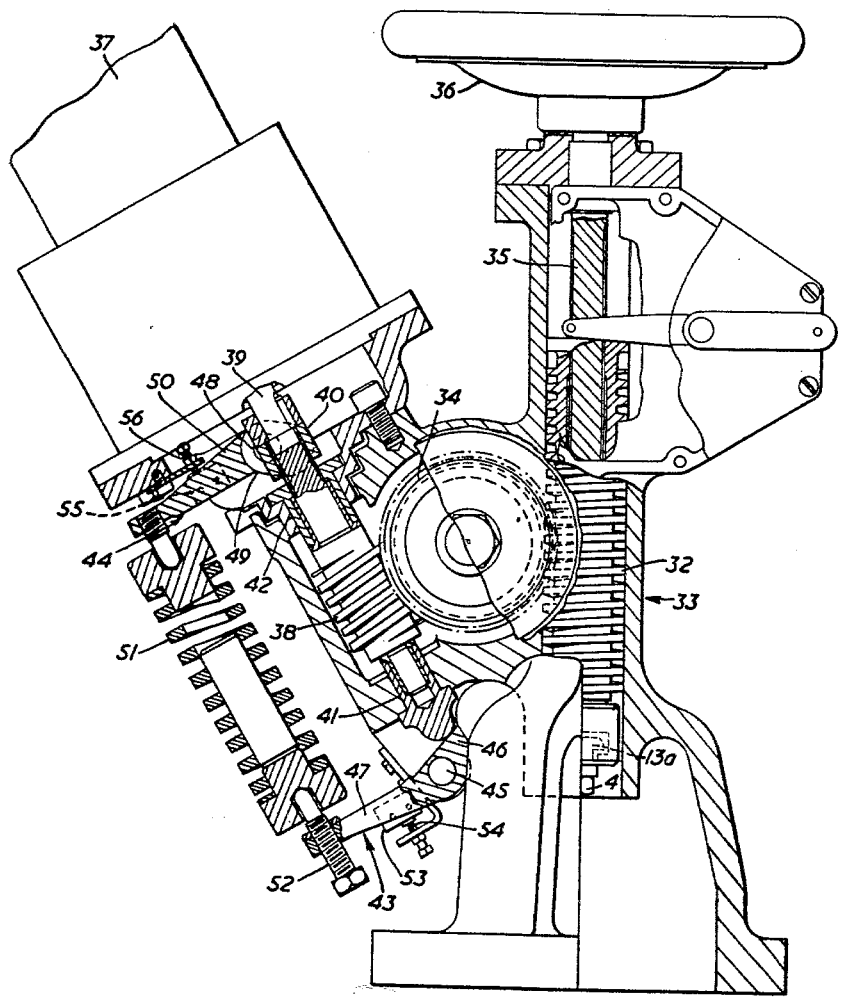

The mechanism according to the invention finds special application to the operation of fluid control valves and two embodiments of the invention will now be described with reference to the accompanying drawings in which:

FIGURE 1 is a sectional elevation of one form of actuating mechanism according to the invention, and FIGURE 2 is a sectional elevation of an alternative form of mechanism according to the invention.

Referring firstly to FIGURE 1 of the drawings, the mechanism illustrated therein comprises a housing indicated generally at 1 provided with feet 2 adapted to be secured to the top plate 3 of a fluid control valve (not shown), having an operating spindle, the upper end of which extends as at 4 through the top plate 3. The housing 1 is formed to provide a vertically extending bore 5 in which is slidably positioned a worm 6 which engages with a worm wheel 7 supported on a shaft 8 journalled in a lateral extension 9 of the housing 1.

The worm 6 is formed with an axial bore 10 in the upper end of which extends a splined shaft 11 drivingly connected with an electric motor 12 supported on the upper end of the housing 1. A suitable keying means (not shown) is provided for engaging the worm with the splined shaft so that the worm is rotatable by the motor 12 and is axially movable with respect to the shaft 11.

The lower end of the bore 10 of the worm accommodates a ball joint 13 for connecting the worm to an actuating member 14 so that the member 14 is axially movable with the worm but is not rotated thereby. The member 14 is provided at its lower end with a collar 15 to which is secured the upper end 4 of the valve operating spindle and a compression spring 16 is interposed between the collar 15 and an annular shoulder 17 on the housing 1 so that the member 14 and the worm are normally biassed in the downward direction to move the operating spindle 4 to the valve closed position.

The upper end of the worm 6 is provided with an annular flange 18 which engages a roller 19 mounted at one end of a lever 20 pivoted as at 21 on the housing and carrying an adjustable stop 22 for engaging the actuating plunger of a micro switch 23 so that when the worm is in the fully raised position, the switch 23 is operated to open the circuit of the motor 12.

A multi-disc electro magnetic brake 24 of known construction is connected to the shaft 8 of the worm wheel 7 and when energised effectively restrains the wheel 7 against rotation.

Provision is also made for manual operation of the worm wheel 7 by means of a second worm 25 adapted to mesh with the worm wheel and secured on a spindle 26 journalled in a bracket 27 pivoted as at 28 on the lateral extension 9 of the housing to permit the bracket to be swung from the position shown in full line in FIGURE 1 in which position the worm 25 is disengaged from the worm wheel, to the position shown in broken line in which the worm 25 engages the worm wheel. Holes 29 and 30 in the lateral extension 9 and in the bracket 27 respectively are brought into register when the bracket is in the broken line position and the bracket is secured in that position by a locking pin (not shown) inserted through the aligned holes 29 and 30.

The spindle 26 has secured thereto a hand wheel 31 for effecting manual rotation of the worm wheel 7 when the worm 25 is engaged therewith. The worm 25 when engaged with the wheel 7 also acts to restrain the wheel against rotation and the brake 24 is not required to be energised.

The mechanism described is basically a differential gear, the worm 6 and the worm wheel 7 having two modes of operation both of which convert a rotary input into a linear output of the actuating member 14. Thus, if the worm 6 is rotated with the worm wheel 7 fixed, there results a "screw jack" action of the worm which is thus displaced axially of the bore 5 of the housing. By making the helix angle of the worm suitably fine this action is self locking. Alternatively, by effecting rotation of the worm wheel 7, there results a rack and pinion action which causes the worm to move axially of the bore 5 and along the splined shaft 11. This latter mode of operation is not self locking and will operate in reverse.

In operation of the mechanism of FIGURE 1, and when it is required to open the valve to which the mechanism is connected, the motor 12 and the brake 24 are both energised. The motor rotates the worm 6 while the brake holds the worm wheel 7 stationary and the above mentioned "screw jack" action results in raising the worm and thereby the valve operating spindle connected thereto, to open the valve. At the same time the spring 16 is compressed and when the worm reaches its fully raised position corresponding to the valve open position of the valve member 4, the lever 20 actuates the micro switch 23 which cuts off the current supply to the motor. The brake 24 remains energised and the mechanism remains in the valve open position.

To close the valve, the brake 24 is de-energised whereon the actuating member 14 is moved downwardly by the force of the compression spring 16 to move the valve erating spindle to the valve closed position, the worm heel 7 rotating freely due to the "rack and pinion" tion between the worm and the worm wheel.

In the event of a current failure or a defect in the otor 12 or the brake 24, or under any other circumances in which it is desired to effect manual operation of the valve, the bracket 27 is swung to the broken line sition to engage the second worm 25 with the worm heel 7. The worm wheel 7 can then be rotated in either ection to raise or lower the worm 6 to effect opening closing of the valve.

The alternative form of mechanism shown in FIGURE comprises a worm 32 slidably supported in a housing and engaging with a worm wheel 34 in a manner nilar to that described with reference to FIGURE 1. e mechanism of FIGURE 2 differs from that of GURE 1 in that the worm 32 is adapted to be roed manually while the worm wheel 34 is arranged to driven by an electric motor.

Thus and referring to FIGURE 2, the worm 32 is dably engaged on a splined shaft 35 rotatably supported the upper end of the housing 33 and carrying a hand heel 36 for effecting rotation of the worm manually. e worm wheel 34 is driven by a reversible electric otor 37 through a second worm 38 engaged with the orm wheel 34. The worm wheel 34 can thus be roed in one direction or the other by means of the motor and through the rack and pinion action between the orm 32 and the worm wheel 34 effect raising or lower-g of the worm 32 to open or close the valve operating indle 4 to which the mechanism is connected through a ball joint 13a, in a manner similar to that described th reference to FIGURE 1. With the motor 37 deergised, manual operation of the valve is possible by tating the hand wheel 36 which rotates the worm 32 ich is thus raised or lowered through the "screw jack" tion between the worm and the worm wheel.

The mechanism of FIGURE 2 is provided with means r stopping the motor and/or giving an audible or visual nal when the actuating member (not shown in GURE 2) reaches a desired limit of travel. To this d the second, or drive worm 38 is connected to the drive aft 39 of the motor 37 by means of a splined coupling which permits axial movement of the worm relative the drive shaft. The drive worm 38 is journalled at ch end in bushes 41 and 42 respectively which bushes e slidably mounted and are engaged by the worm so at axial movement of the worm in one direction or the her causes sliding movement of the corresponding bush or 42. The bushes 41 and 42 are maintained in gagement with the worm by means of spring loaded voted levers 43 and 44 respectively.

As shown in the drawing, the lower lever 43 is pivoted ljacent one end as at 45 to provide a short nose portion which engages the bush 41, and a long arm 47. In a nilar manner the upper lever 44 is pivoted as at 48 to ovide a short nose portion 49 engaging the bush 42, and long arm 50. A compression spring 51 is engaged tween the ends of the long arms 47 and 50 of the levers and 44 to urge the nose portions of the levers into gagement with the respective bushes and the comession of the spring is adjustable by means of a screw readed stud 52 supported in the long arm 47 of the ver 43.

It will be apparent that thrust applied in either direcon to the worm 32 will be communicated through the orm wheel 34 to the drive worm 38 which will thus be ged in one direction or the other against the spring ading of the respective bush 41 or 42 and when the rust communicated to the drive worm exceeds a value termined by the spring loading of the levers 43 and 44, e force exerted on either the bush 41 or the bush 42 by e drive worm will overcome the restraining force exert-ed by the associated lever 43 or 44 and the bush will be moved outwardly to cause its associated lever to pivot.

The lever 43 has secured thereto a micro switch 53, the actuating member of which is engaged with a fixed stop 54 when the lever is in the normal position shown in FIGURE 2, the switch 53 being normally in the circuit closed condition and upon pivoting of the lever as above described is operated to the circuit open condition. In similar manner the lever 44 carries a micro switch 55 engageable with a fixed stop 56. The micro switches 53 and 55 are connected to control the energising circuit of the motor 57 so that upon opening of either switch the energising circuit is disconnected and the motor stops. The switches 53 and 55 thus operate as limit switches to stop the motor when the thrust exerted by the drive worm 38 in one direction or the other overcomes the spring loading of the respective lever 43 or 44 causing the lever to pivot and effect opening of its associated switch. Conveniently the switches 53 and 55 are connected in a manner such that when the motor 37 is cut out by operation of one of the switches i.e. by excess thrust of the worm 38 in one direction, the motor can be restarted only in the reverse direction.

Additionally or alternatively the switches 53 and 55 may be connected to operate a visual and/or audible alarm upon opening of either switch.

The arrangement described provides a means for controlling automatically the movement of the actuating member connected with the worm 32 in response to thrust exerted on the member at each end of its operating circuit and in the case in which the actuating member controls the operation of a fluid control valve for example, and by suitably adjusting the compression of the spring 51, a required pressure of the valve member on its seating is obtained before the motor cuts out.

I claim:

1. An actuating mechanism for imparting linear movement comprising a helical worm, a housing supporting said worm for axial movement, means connecting the worm to an actuating member for effecting linear movement thereof upon said axial movement of the worm, means for rotating the said worm, a worm wheel engaged with said worm, a drive worm engaged with said worm wheel for effecting rotation thereof, the pitch angle of the drive worm and worm wheel providing an irreversible drive from the drive worm to the worm wheel and means for rotating said drive worm, the tooth pitch of the worm and worm wheel being made such that upon rotation of the axially movable worm when said drive worm is stationary the axially movable worm is axially displaced by "screw jack" coaction between the axially movable worm and the worm wheel, and when the worm-rotating means is stationary and the drive worm is rotated to effect rotation of the worm wheel, the axially movable worm is axially displaced by "rack and pinion" coaction between the worm wheel and the worm.

2. An actuating mechanism as claimed in claim 1 in which the means for rotating the axially movable worm is manually operable and the drive worm rotating means comprises an electric motor drivingly connected with the drive worm.

3. An actuating mechanism for imparting linear movement comprising a helical worm, means supporting said worm for axial movement, an actuating member, means connecting the worm to the actuating member for effecting linear movement thereof upon said axial movement of the worm, a worm wheel engaged with said worm, power actuated means connected to said worm wheel, said power actuated means being operative to effect rotation of the worm wheel and effective, when inoperative, to restrain the worm wheel against rotation, and manually operable means for effecting rotation of the worm, the tooth pitch of the worm and worm wheel being made such that when the power actuated means is operated to rotate the worm wheel the worm is axially displaced by "rack and pinion" coaction between the worm and worm wheel; and when the power actuated means is inoperative and the worm is rotated by said manually operable means, the worm is axially displaced by "screw jack" coaction between the worm and the worm wheel.

4. An actuating mechanism according to claim 3 wherein the said power actuated means comprises a drive worm engaged with the worm wheel the pitch angle of the drive worm and worm wheel providing an irreversible drive from the drive worm to the worm wheel and an electric motor connected to said drive worm for effecting rotation thereof.

5. An actuating mechanism according to claim 4 wherein the said drive worm is axially displaceable, there being provided displaceable means resiliently restraining the drive worm against such axial displacement, the arrangement being such that when the axial thrust on the drive worm exceeds a predetermined amount, the said restraining means is displaced to cause operation of switch means for de-energising the electric motor.

6. An actuating mechanism according to claim 5 wherein the said restraining means comprises bushes rotatably supporting the drive worm at each end thereof and mounted for axial sliding movement, and a spring loaded pivoted lever engaging each of said bushes to restrain it against said axial sliding movement, whereby upon the axial thrust of the drive worm in one direction exceeding the spring loading of the lever engaging the corresponding bush, the lever is pivoted against the spring loading and effects operation of an electric switch associated therewith.

7. An actuating mechanism according to claim 6 wherein the spring loading of said levers is provided by a single compression spring interposed between the said levers in engagement therewith.

8. An actuating mechanism for imparting linear movement comprising a helical worm (6, 32), a housing (1, 33) supporting said worm for axial movement, an actuating member (14), means (13) connecting the worm to the actuating member for effecting linear movement thereof upon said axial movement of the worm, a worm wheel (7, 34) engaged with said worm, means (24 and 38) for restraining the worm wheel against rotation, means (12, 36) for rotating the worm, and means (31, 37) for rotating the worm wheel, the tooth pitch of the worm and worm wheel being made such that when the said restraining means is effective to prevent rotation of the worm wheel, and the worm is rotated, the worm is axially displaced by "screw jack" coaction between the worm and worm wheel, and when the restraining means is released and the worm wheel is rotated, the worm is axially displaced by "rack and pinion" coaction between the worm wheel and the worm.

References Cited by the Examiner
UNITED STATES PATENTS

| 1,665,227 | 4/28 | Smith | 74—425 |
| 2,092,563 | 9/37 | Tucker | |
| 2,627,377 | 3/53 | Fletcher | |
| 2,660,072 | 11/53 | Veenschoten | 74—625 |
| 3,012,448 | 12/61 | Abraham | 74—625 |

BROUGHTON G. DURHAM, *Primary Examiner.*